United States Patent [19]

Kazamir

[11] 4,250,443
[45] * Feb. 10, 1981

[54] BATTERY CHARGER ADAPTER INCLUDING SNAP TYPE ASSEMBLY MEANS

[75] Inventor: Raymond Kazamir, Gainesville, Fla.

[73] Assignee: General Electric Company, Gainesville, Fla.

[*] Notice: The portion of the term of this patent subsequent to Jul. 8, 1997, has been disclaimed.

[21] Appl. No.: 972,254

[22] Filed: Dec. 22, 1978

[51] Int. Cl.³ .................... H01M 2/26; H01M 10/46
[52] U.S. Cl. ......................................... 320/2; 429/121
[58] Field of Search ............... 220/339; 320/2; 429/1, 429/121

[56] References Cited

U.S. PATENT DOCUMENTS

| | | | |
|---|---|---|---|
| 3,037,616 | 6/1962 | Phipps, III | 220/339 X |
| 3,579,075 | 5/1971 | Floyd . | |
| 3,825,110 | 7/1974 | Halbich et al. | 220/339 X |
| 3,968,880 | 7/1976 | Ostrowsky | 220/339 X |
| 4,009,429 | 2/1977 | Mullersman . | |
| 4,084,037 | 4/1978 | Morton | 429/1 |

*Primary Examiner*—Robert J. Hickey
*Attorney, Agent, or Firm*—Morgan, Finnegan, Pine, Foley & Lee

[57] ABSTRACT

A one piece molded, plastic body has two plate-like portions interconnected at associated edges by an integral hinge. The portions have molded in pockets for receiving a diode and transistor energy concentrator, and means for securing the portions into a unitary adapter by snapping the plates together under pressure.

3 Claims, 6 Drawing Figures

BATTERY CHARGER ADAPTER INCLUDING SNAP TYPE ASSEMBLY MEANS

CROSS REFERENCE TO RELATED APPLICATIONS

This application is related to the following commonly assigned applications filed on the dates indicated: Ser. No. 877,297, filed Feb. 13, 1978; Ser. No. 877,281, filed Feb. 13, 1978; Ser. No. 877,299, filed Feb. 13, 1978; and Ser. No. 878,453, filed Feb. 16, 1978.

BACKGROUND OF THE INVENTION

This invention relates to rechargeable batteries and more particularly to a simple, inexpensive, charging system whereby a rechargeable battery of the 9 volt physical size and/or electrical characteristics is selectively and alternatively connectible to a charge current source for recharging of the type described in U.S. Pat. No. 4,009,429.

There is an increasing number of consumer products being operated by rechargeable cells such as nickel-cadmium cells. These products require cells with a plurality of physical sizes and electrical characteristics. The variety of cell types in wide use in the consumer market has given rise to the need to provide a unitary charging device to accommodate the various cell types. One such device is described in U.S. Pat. No. 3,579,075 issued on May 18, 1971 and assigned to the assignee of the invention herein. While this device provides a viable approach for charging cells of a variety of types, it has failed to achieve widespread adoption in the consumer market because of its complexity and cost of construction. The system described in the above-identified U.S. Pat. No. 4,009,429 is useful in charging AA, C & D size batteries, but does not accept 9 volt size batteries. Commonly assigned application Ser. No. 877,297 discloses an improved system for 9 volt rechargeable batteries with the use of an adapter. Commonly assigned application Ser. No. 878,453 utilizes in combination a charger and 9 volt size battery which are interconnected by an adapter module. The adapter is designed to mechanically and electrically join the battery to the charger so that a highly compact system results. Electrical means such as diodes and resistors are carried by the adapter to transform the charger characteristics to those useful for the 9 volt battery. Thus, the usefulness of the charger is expanded to include 9 volt size batteries. The adapter in Ser. No. 878,453 is a single molded housing having two folded portions interconnected by a hinge and ultrasonically bonded by means of integral energy concentrators.

SUMMARY

The present invention is an improvement on the hinge-type adapter described in Ser. No. 878,453.

The system of this invention uses an alternate method of securing the adapter in which the respective portions (leafs) of the adapter housing are provided with snappable gripping means whereby the adapter can be closed into a unitary structure by snapping under pressure. This obviates the need for subsequent holding means such as ultrasonic welding, heat or solvent sealing, and the like.

DETAILED DESRIPTION

Figure 1:
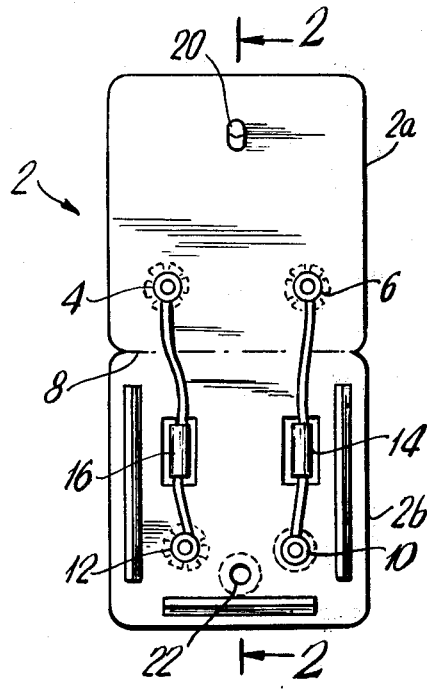
FIG. 1 is a plan view of an adapter of this invention in the open position.

While this invention is susceptible of embodiment in many different forms, there is shown in the drawings and will hereinafter be described in detail two preferred embodiments of the invention, and modifications thereto, with the understanding that the present disclosure is to be considered as an exemplification of the principles of the invention and is not intended to limit the invention to the embodiments illustrated.

The overall charging system of which the present adapter forms an element is shown in Ser. No. 878,453, and need not be repeated here to save unnecessarily detailed description.

The Adapter

Figure 3:
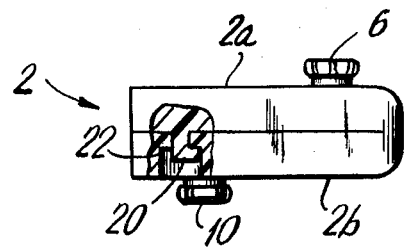
FIG. 3 is a side elevation view of the adapter of FIG. 2 in the assembled position.

Referring to FIG. 3, adapter 2 is the bridging element between a charger and battery (not illustrated) and serves two functions; namely, physically attaching or mounting the battery and electrically connecting the terminals of the charger to the terminals of the battery.

Figure 2:
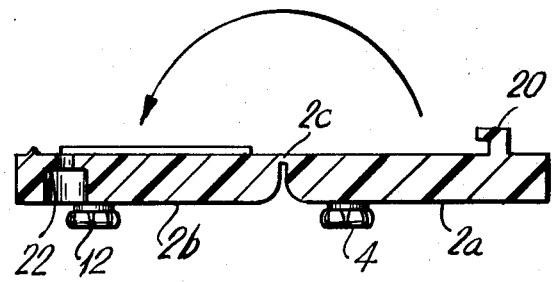
FIG. 2 is a cross-sectional view taken along line 2—2 in FIG. 1.

To these ends, adapter 2 includes a pair of one-way female snap terminals 4, 6 attached to one surface of housing 8, see FIG. 1, which interconnect with the charger terminals, and on an opposite surface a second set of one-way snap terminals, a male terminal 10 and female terminal 12, FIG. 2, which interconnect with the battery terminals, respectively. The one-way snap type terminal not only provides electricl contact but also mechanical gripping to support the battery on the charger.

Electrical circuitry is carried by the adapter to provide suitable conditioning to the source of battery characteristic by current and voltage control. To this end rectifying means, particularly a half-wave rectifier 14, such as a diode, is connected between terminals 6 and 10 and a resistor 16 is connected between terminals 4 and 12. It will be appreciated by those skilled in the art that other arrangements of electrical components may also be utilized to provide suitable conditioning of the source to the battery.

Adapter housing 8 is preferably of a molded plastic construction. The adapter housing shown in FIG. 1–3 has a fully enclosed structure formed by a housing portion 2a and closure portion 2b. Portion 2a and 2b are integrally joined by a hinge 2c.

The outer surface of bottom portion 2b, FIG. 2, carries charger terminals 10 and 12 and has a clearance area for receipt of a charger terminal. The interior surface of portion 2a includes a molded pin with hook 20, which mates with and locks with a snapping action into aperture 22 when the adapter is folded about hinge 2c and the portions are pressed together.

The outer surface of top portion 2a, FIG. 1 carries battery terminals 4 and 6. After the terminals, diode and resistor have been assembled on the adapter in the open position, FIGS. 1 and 2, and portion 2a is folded about hinge 2c to place the inner surfaces in abutting relationship and pin 20 snaps into the receiving opening 22 to bind the adapter in the folded configuration shown in FIG. 3.

Figure 4:
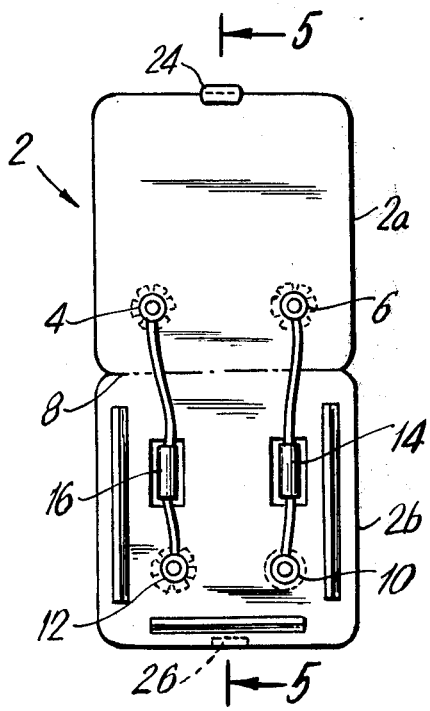
FIG. 4 is a plan view of another adapter of this invention in the open position.
Figure 5:
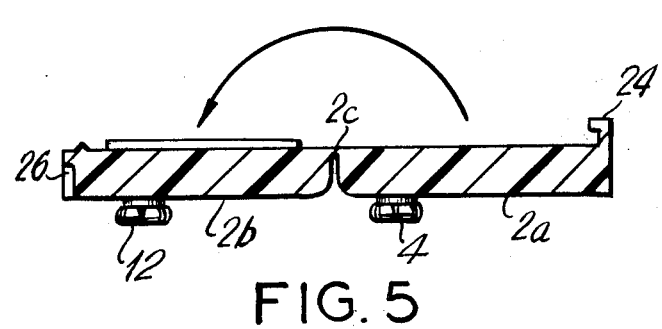
FIG. 5 is a cross-sectional view taken along line 5—5 in FIG. 4.
Figure 6:
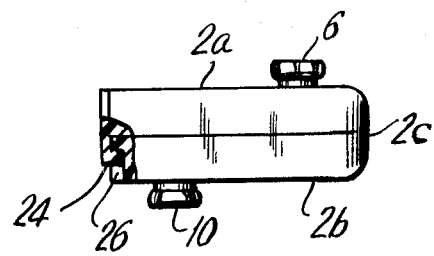
FIG. 6 is a side elevation view of the adapter of FIG. 4 in the assembled position.

Alternatively, as is shown in FIG. 4–6, locking is effected by providing portion 2a with a flexible interference-type grasper 24 and portion 2b with a ridge 26, folding about hinge 2c to place the inner surfaces in abutting relationship and then grasper 24 snaps over ridge 26 to bind the adpater in the folded configuration shown in FIG. 6.

These and other nodifications may be made to the invention without departing from the scope and spirit thereof as pointed out in the appended claims.

I claim:

1. A charging adpater comprising a molded, insulating, unitary housing having first and second portions interconnected by an integral hinge at abutting edges thereof, whereby said portions may be folded over into abutting juxtaposition; said first and second portions having terminal contacts thereon on opposed surfaces thereof in the folded position, the interior juxtaposed surfaces having cavities therein, and electrical means connecting associated terminal contacts within said cavities, said first and second portions including snappable grasping means whereby when said adapter is snapped together under pressure a unitary adapter is formed.

2. The charging adapter of claim 1, wherein said grasping means comprise an integrally molded pin on said first portion and a pin-receiving molded-in opening in said second portion.

3. The charging adapter of claim 1, wherein said grasping means comprise flexible interference type graspers on said first and second portions remote from said hinge.

* * * * *

UNITED STATES PATENT AND TRADEMARK OFFICE
CERTIFICATE OF CORRECTION

PATENT NO. : 4,250,443
DATED : February 10, 1981
INVENTOR(S) : Raymond K. Sugalski It is certified that error appears in the above—identified patent and that said Letters Patent is hereby corrected as shown below:

On the title page, item No. 75 should read as follows:
-- Raymond Kazimir Sugalski --.

Signed and Sealed this

Fifteenth Day of September 1981

|SEAL|

Attest:

GERALD J. MOSSINGHOFF

Attesting Officer — Commissioner of Patents and Trademarks